(12) United States Patent
Liang et al.

(10) Patent No.: US 9,780,898 B2
(45) Date of Patent: Oct. 3, 2017

(54) TDMA ACCESS METHOD AND DEVICE BASED ON MULTIPLE ACCESS POINTS

(71) Applicant: SHENYANG INSTITUTE OF AUTOMATION OF THE CHINESE ACADEMY OF SCIENCES, Liaoning (CN)

(72) Inventors: Wei Liang, Liaoning (CN); Shuai Liu, Liaoning (CN); Xiaoling Zhang, Liaoning (CN); Yutuo Yang, Liaoning (CN); Haibin Yu, Liaoning (CN)

(73) Assignee: SHENYANG INSTITUTE OF AUTOMATION OF THE CHINESE ACADEMY OF SCIENCES, Shenyang, Liaoning (CN)

( * ) Notice: Subject to any disclaimer, the term of this patent is extended or adjusted under 35 U.S.C. 154(b) by 217 days.

(21) Appl. No.: 14/427,210

(22) PCT Filed: Jan. 10, 2013

(86) PCT No.: PCT/CN2013/070326
§ 371 (c)(1),
(2) Date: Mar. 10, 2015

(87) PCT Pub. No.: WO2014/040398
PCT Pub. Date: Mar. 20, 2014

(65) Prior Publication Data
US 2015/0244486 A1    Aug. 27, 2015

(30) Foreign Application Priority Data

Sep. 17, 2012 (CN) .......................... 2012 1 0345480

(51) Int. Cl.
*H04J 3/16* (2006.01)
*H04W 16/18* (2009.01)
(Continued)

(52) U.S. Cl.
CPC .......... *H04J 3/1694* (2013.01); *H04B 7/2656* (2013.01); *H04L 5/0055* (2013.01);
(Continued)

(58) Field of Classification Search
None
See application file for complete search history.

(56) References Cited

U.S. PATENT DOCUMENTS 7,668,147 B2 * 2/2010 Lindsay ................ G10L 19/012
370/280
8,699,411 B1 * 4/2014 Gossett ............. H04W 72/0486
370/328
(Continued)

FOREIGN PATENT DOCUMENTS

CN    101500314    8/2009
CN    101651969 A   2/2010
(Continued)

OTHER PUBLICATIONS

Espacenet publication, translation of CN102340819 A, Jan. 2, 2012, "Conflict-free transmission method and system of sensor network" (Foreign Reference document, Applicant-provided).*
(Continued)

*Primary Examiner* — Mohammad Adhami
*Assistant Examiner* — Vladislav Agureyev
(74) *Attorney, Agent, or Firm* — Smith, Gambrell & Russell, LLP

(57) ABSTRACT

The present invention relates to a TDMA access method and device based on multiple access points. According to the problems that the existing method cannot simultaneously satisfy the demands of timeliness and reliability in actual industrial application and has low resource utilization rate, the present invention takes full consideration of the transmission characteristics and industrial automation application
(Continued)

characteristics of wireless networks, and provides a TDMA access method and device based on multiple access points. The main ideas of the method in the present invention are: the multi-access point redundant communication manner is adopted to improve system reliability, beacon frames of multiple access points are utilized to perform time synchronization so as to improve synchronization precision, confirmation messages are fed back with regard to reliable access points to reduce the number of retransmissions, and a modularized multi-access point device design method is adopted to lower the difficulties of device maintenance and management.

12 Claims, 3 Drawing Sheets

(51) Int. Cl.
    *H04L 5/00*         (2006.01)
    *H04W 40/24*     (2009.01)
    *H04W 72/04*     (2009.01)
    *H04B 7/26*        (2006.01)

(52) U.S. Cl.
    CPC ......... *H04W 16/18* (2013.01); *H04W 40/244* (2013.01); *H04W 72/0446* (2013.01)

(56) References Cited

U.S. PATENT DOCUMENTS

| | | | |
|---|---|---|---|
| 2007/0076762 A1* | 4/2007 | Manjeshwar | H04B 7/2696 370/503 |
| 2008/0137600 A1* | 6/2008 | Jeon | H04W 72/0446 370/329 |
| 2013/0107705 A1* | 5/2013 | Dinan | H04W 72/0446 370/230 |
| 2013/0286959 A1* | 10/2013 | Lou | H04W 72/04 370/329 |

FOREIGN PATENT DOCUMENTS

| | | | |
|---|---|---|---|
| CN | 102118849 | | 7/2011 |
| CN | 101651969 B | | 1/2012 |
| CN | 102340819 | | 2/2012 |
| CN | 102340819 A | * | 2/2012 |
| CN | 102404855 | | 4/2012 |
| CN | 102413581 | | 4/2012 |

OTHER PUBLICATIONS

International Search Report and Written Opinion of the International Searching Authority for PCT/CN2013/070326 (Chinese with English Translation) Mar. 21, 2013 (16 pages).

* cited by examiner

TDMA ACCESS METHOD AND DEVICE BASED ON MULTIPLE ACCESS POINTS

TECHNICAL FIELD

This invention relates to industrial wireless network technology, specially a TDMA access method and device based on multiple access points.

DESCRIPTION OF RELATED ART

Industrial wireless network technology is a trending technology in the industrial measurement and control field after fieldbus, is a revolutionary technology for reducing the cost of the industrial measurement and control system and enlarging application range, and also is a new growth point of industrial automation products in the next few years. The industrial wireless network technology, applicable to severe industrial field environments and having the technical characteristics of strong anti-interference capability, low energy consumption and real-time communication, is a functional extension and technical innovation to the present wireless technology in the industrial application direction and finally turns into a new wireless technology standard. At present, industrial wireless network technology is gradually applied to the high-speed factory automation field and is another focus of international competition on the wireless network technology after the industrial wireless network technology facing process automation. An industrial wireless network facing factory automation is a factory automation wireless network, which has the advantages of low cost, easy installation and easy maintenance of the industrial wireless network and is capable of avoiding problems such as easy aging of cables, pollution of cables and easy failure of power contacting of slip rings resulting from the movement of the factory equipment. However, the factory automation wireless network faces more rigorous demands, including: (1) Large network scale; it is required to support the quantity of a hundred to a thousand nodes; (2) high communication rate; the transmission rate shall be Mbit/s; (3) high reliability; the end-to-end transmission success rate is required to be 10e-9; and (4) high real-timeliness; the end-to-end communication delay is required to be less than 10 ms.

Based on the above requirements of the factory automation wireless network, the TDMA (Time Division Multiple Access) medium is a comparatively ideal access medium of the MAC (Medium Access Control) layer of the industrial wireless network. The reason is as follows: First, the industrial wireless network has the demand of certainty to the performance; second, with the limitation of the industrial application environment, the topological structures of the present most networks are relatively stationary and are often hierarchical structures; in addition, most of the data in the industrial field has periodic characteristics.

Nevertheless, a factory automation wireless network adopting the TDMA medium still has the following problems: (1) Because of the openness of wireless medium and the specialization of industrial electromagnetic interference environment, the data packet transmission is quite uncontrollable and uncertain; even after the data packet is retransmitted for many times, the end-to-end reliability requirement, in particular factory automation application, is difficult to be satisfied; (2) the realization of high reliability by pre-assigning a fixed number of retransmission time slots is a common method of industrial wireless network; in fact, most of the retransmission time slots cannot be utilized, which results in low resource utilization rate, so that the industrial wireless network is difficult to accommodate massive nodes.

The present factory automation wireless networks commonly adopt a single AP (Access Point) star network topology, which is the bottleneck of combining single APs into the whole network. Once a single AP is broken, the network collapses; in addition, the factory environment has many mobile devices such as robots, track-mounted equipment and automated guided vehicles (AGV), so that the monitored industrial wireless network nodes shall be mobile. In these application occasions, the network nodes may be moved to an area incapable of being communicated with the single AP, resulting in the failure of message transmission and the influence to the reliability of the industrial wireless network. An intuitive and effective method of solving the above problems is as follows: many APs are distributed in the network and can communicate with the other sites.

BRIEF SUMMARY OF THE INVENTION

With regard to the problem that the AP failure in the present static network results in the network collapse and with regard to the current situation that the TDMA method of the industrial wireless network cannot simultaneously satisfy the demands of timeliness and reliability in actual industrial application, the invention introduces a plurality of access points and provides a TDMA access method and device based on multiple access points.

A technical solution adopted by the invention to realize the above purposes is as follows: A TDMA access method based on multiple access points comprises the following steps:

A multi-AP access device is commanded as the time source of the whole network and the STA utilizes beacon frames broadcasted by the multi-AP access device to perform time synchronization;

The multi-AP access device containing n access points (AP) is divided into k groups, in which k is a natural number and is not less than 1 and not more than n;

According to the quantity j of the APs within any group $B_i=\{AP_{i1}, AP_{i2}, \ldots AP_{ij}\}$, super-frames with length of m are divided into k sub-super-frames, in which the $i_{th}$ sub-super-frame corresponds to the group $B_i$;

Within the corresponding $i_{th}$ sub-super-frame of the group $B_i$, time slots are reserved from the $i_{th}$ sub-super-frame and the quantity of the reserved time slots is equal to the quantity j of the APs in the group $B_i$;

With regard to the $AP_{ij}$ within any group $B_i$, ($1 \leq i \leq k$), if Formula ASN % $m=(m/k)*(i-1)+j$ is true, the $AP_{ij}$ broadcasts the beacon frame within the time slot ASN, or else does not make any response; and the ASN is the present absolute time slot number and is counted from 1.

The beacon frames are broadcast frames transmitted by the APs and include network numbers, time slot stamps and network resource management.

The grouping principle of dividing the multi-AP access device containing n APs into k groups is as follows:

(1) The overlap section of each AP transmission range in the group is the minimum section;

(2) The union set of all AP transmission ranges in the group is capable of covering the whole network.

The calculation method of the quantity j of the APs in the group $B_i=\{AP_{i1}, AP_{i2}, \ldots AP_{ij}\}$ is as follows: if n % k equals to zero, j equals to n/k; or else, when i is not less than 1 and not more than k−1, j equals to $\lfloor n/k \rfloor$; and when i equals to k, j equals to the sum of $\lfloor n/k \rfloor$ and (n % k).

After the multi-AP access device receives the data packet of the STA, a method of replying ACK to the STA by a network management module is as follows: if only one AP receives the data packet of the STA, the AP directly replies ACK; if multiple APs receive the data packet of the STA, each AP replies ACK according to the packet receiving success rate and the received signal strength indication RSSI.

The principle of each AP for replying ACK according to the packet receiving success rate and the received signal strength indication RSSI is as follows: When multiple APs receive the data packet of the STA, search a communication link quality mapping table, find out the AP corresponding to the maximum packet reception success rate of the STA and send ACK by the AP in the corresponding time slot; with regard to multiple APs having the same packet reception success rate, search the AP with the maximum RSSI value from these APs and send ACK by the AP in the corresponding time slot; and with regard to multiple APs having the same packet receiving success rate and the same RSSI value, randomly choose one AP to reply ACK.

The communication link quality mapping table is a mapping table of communication link quality between each STA and all APs of the network in the gateway maintenance; the mapping table comprises the packet reception success rate and the RSSI value, which are updated continuously along with the communication process.

A TDMA access device, based on multiple access points, comprises a station STA, access points AP, a gateway and a controller; the STA is connected with the field equipment in the industrial field and is responsible for acquiring field data and controlling the production process; the device is characterized in that the STA is wirelessly connected with multiple access points AP in the multi-AP access device; multiple access points AP is in a wired connection with one gateway of the multi-AP access device; the multi-AP access device is used for transmitting the sensor data of the field equipment acquired by the STA to the controller and transmitting the control information of the controller to an actuator on the field equipment.

Multiple APs Share One Address and Work in Parallel

The multi-AP access device comprises a TDMA module, a user datagram protocol communication module, a packet-filtering module, a buffer cache management module and a network management module; the user datagram protocol communication module adopts an UDP (user datagram protocol) communication protocol and is used for transmitting data packets from multiple APs; the packet-filtering module is connected with the user datagram protocol communication module and used for filtering redundant repetition packets; the buffer cache management module is connected with the user datagram protocol communication module and the packet-filtering module and used for managing and accessing the buffer cache; the network management module is connected with the buffer cache management module and used for delivering the data packet to the gateway; and the TDMA module is connected with the user datagram protocol communication module and the network management module, is used for organizing TDMA super-frame communication and comprises an ACK replying sub-module.

The invention has the following advantages:

The TDMA access method and device based on multiple access points provided by the invention is proposed on the premise of taking full consideration of the transmission characteristics and industrial automation application characteristics of wireless networks; with adoption of multiple access points, the packet loss probability can be greatly reduced, the reliability of the system is improved, the retransmission times is reduced, the resource utilization rate is improved, the network capability is increased and the effective handling capacity of the system is improved; and the specific advantages are embodied as follows:

1. The method of the invention adopts a multi-AP redundant communication manner; with regard to the data transmitted to a station (STA), even if partial APs do not receive the data because of the electromagnetic interference or shielding of the industrial environment, just make sure that at least one AP receives the data; therefore, the reliability of the system can be improved;

2. In the inventive method, the STA can receive the beacon frames of multiple APs for time synchronization within a super-frame period, so that the time synchronization precision is improved, the time slot is shortened and the resource utilization rate is improved;

3. The inventive method designs a method of choosing the reliable AP corresponding to the STA to reply ACK (Acknowledgment) according to the communication link quality; on the premise that the high reliability of the ACK is guaranteed, the ACK replying conflict of the access device in the multi-AP condition is avoided, the retransmission times is reduced and the resource utilization rate is improved;

4. The multi-AP access device proposed by the invention is based on a modular design method; with regard to the situation characteristics that multiple APs receive duplication packets with the same serial number and different types of industrial data, a packet-filtering module and a buffer cache management module are designed specially, the difficulty of maintenance and management of the whole device is reduced and the multi-AP access device has the advantages of flexibility, low energy consumption and easy realization.

DETAILED DESCRIPTION OF THE INVENTION

The invention is further described with the following drawings and embodiment.

Figure 1:
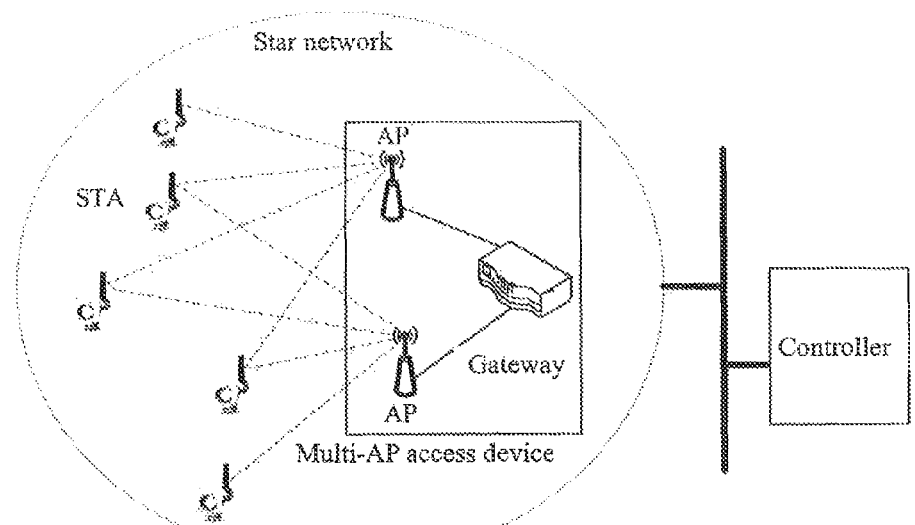
FIG. 1 is the typical structural diagram of the star topology of the industrial wireless network.

The TDMA access method and device based on multiple access points proposed by the invention is based on the factory automation wireless network of the star structure constructed with multiple STA equipment and the multi-AP access device and is shown in FIG. 1. The STA is connected with the equipment such as sensors, brakes and actuators in the industrial field and is in charge of acquiring the field data and controlling the production process; the multi-AP access device consists of multiple APs and one gateway and is in charge of data interaction between the field equipment and the controller; specifically, the multi-AP access device is an actuator for transmitting the sensor data on the field equipment to the controller or transmitting the control information of the controller to the field equipment. The multi-AP access device and the gateway are in a wired connection; and multiple APs in the multi-AP access device share one address and work in parallel.

Figure 2:
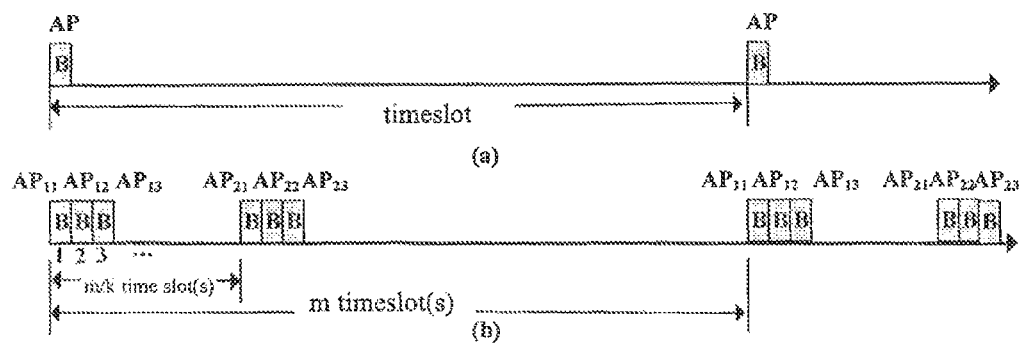
FIG. 2 is the TDMA super-frame diagram.

After the network is constructed, the communication between the multi-AP access device and the STA is organized by adopting the beacon-based TDMA super-frame. The TDMA super-frame is a union set of periodically repeated time slots and FIG. 2(a) is the diagram of the single-AP super-frame. If the length of the super-frame is m, the AP utilizes the first time slot of the super-frame to broadcast the beacon frame; after m time slots, the AP broadcasts the beacon frame again to represent the beginning of the next super-frame. The beacon frame is a broadcast frame transmitted by the AP and includes communication information such as network number, time stamp and network resource management.

In the whole process of the TDMA communication, the network requires strict time synchronization. The multi-AP access device in the network is used as the time source of the whole network, and the STA in the network utilizes the beacon frames broadcasted by the multi-AP access device to perform time synchronization.

With regard to the multi-AP access device containing n APs, the transmission process of the beacon frames adopts a grouping management mode. The n APs are divided into k groups, in which k is a natural number and is not less than 1 and not more than n. With regard to any $B_i$ ($1 \leq i \leq k$), the grouping principle of APs comprises:

(1) The overlap section of each AP transmission range in the group is the minimum section;

(2) The union set of all AP transmission ranges in the group is capable of covering the whole network.

The APs in the any group $B_i$ ($1 \leq i \leq k$) are marked as $B_i = \{AP_{i1}, AP_{i2} \ldots AP_{ij}\}$, in which the calculation of the numeric value of j is as follows:

(3) If n % k equals to zero, j equals to n/k;

(4) Or else, when i is not less than 1 and not more than k−1, j equals to $\lfloor n/k \rfloor$; and when i equals to k, j equals to $\lfloor n/k \rfloor + (n \% k)$.

The corresponding TDMA communication process of the AP after grouping comprises the following steps:

(1) According to the quantity j of the APs within any group $B_i = \{AP_{i1}, AP_{i2}, \ldots AP_{ij}\}$, the super-frames with length of m (m is not less than n) are divided into k sub-super-frames, in which the $i_{th}$ sub-super-frame corresponds to the group Bi ($1 \leq i \leq k$);

(2) Within the corresponding $i_{th}$ sub-super-frame of the group Bi ($1 \leq i \leq k$); time slots are reserved from the $i_{th}$ sub-super-frame and the quantity of the reserved time slots is equal to the quantity j of the APs in the group $B_i$ ($1 \leq i \leq k$);

(3) The present absolute time slot number is assumed as ASN (counted from 1); with regard to the $AP_{ij}$ within any group Bi ($1 \leq i \leq k$), if the Formula ASN % m=(m/k)*(i−1)+j is true, the $AP_{ij}$ broadcasts the beacon frame within the time slot ASN, or else does not make any response.

The process of grouping and broadcasting the beacon frames by the multi-AP access device is specifically described with the following drawing 2(b). Suppose that the multi-AP access device includes six APs (n=6), which are shown as $AP_{11}$, $AP_{12}$, $AP_{13}$, $AP_{21}$, $AP_{22}$ and $AP_{23}$ and divided into two groups; the group $B_1$ includes $AP_{11}$, $AP_{12}$ and $AP_{13}$ and the group $B_2$ includes $AP_{21}$, $AP_{22}$ and $AP_{23}$; that is, the group $B_1$ and the group $B_2$ contain three APs, respectively. The length of the super-frame is assumed to be 16 (m=16); the super-frame is divided into two sub-super-frames, corresponding to the group $B_1$ and the group $B_2$; the first three time slots of the two sub-super-frames are reserved and used for the APs in the group $B_1$ and the group $B_2$ to broadcast the beacon frames. When ASN equals to 2, i equals to 1; when j equals to 2 and the Formula ASN % m=(m/k)*(i−1)+j is true, the $AP_{12}$ sends the beacon frames. The broadcast situations of the other beacon frames are the same and the final result is shown in FIG. 2(b).

The broadcasting of the beacon frames of the AP adopts a grouping management method, that is a multi-AP technology; with regard to each STA, ensure that the beacon frames of any AP within the super-frame period are received and the time synchronization can be finished; the STA may perform time synchronization many times within the super-frame period, so that the time synchronization precision is improved; in addition, the method is simple and flexible and the difficulty of maintenance and management is lowered.

Multiple APs in the multi-AP access device share one address and work in parallel; the specific method is as follows: when the STA sends the data packet, multiple APs receive the data packet simultaneously. When multiple APs receive the same data packet from the STA, the gateway filters the duplication packets by using the serial number.

A method of replying ACK to the STA by the multi-AP access device is as follows:

(1) If only one AP receives the data packet of the STA, the AP directly replies ACK;

(2) If multiple APs receive the data packet of the STA, each AP replies ACK according to the packet receiving success rate and the received signal strength indication (RSSI); and the specific principle is as follows:

When multiple AP receives the data packet of the STA, search a communication link quality mapping table, find out the AP corresponding to the maximum packet receiving success rate of the STA and send ACK by the AP in the corresponding time slot;

With regard to multiple APs having the same packet receiving success rate, search the AP with the maximum RSSI value from these APs and send ACK by the AP in the corresponding time slot;

With regard to multiple APs having the same packet receiving success rate and the same RSSI value, randomly choose one AP to reply ACK.

The communication link quality mapping table is a mapping table of communication link quality between each STA and all APs of the network in the gateway maintenance in order to support the ACK replying medium based on the communication link quality. The communication link quality mainly comprises the packet receiving success rate and the RSSI value, which are updated continuously along with the communication process.

Figure 3:
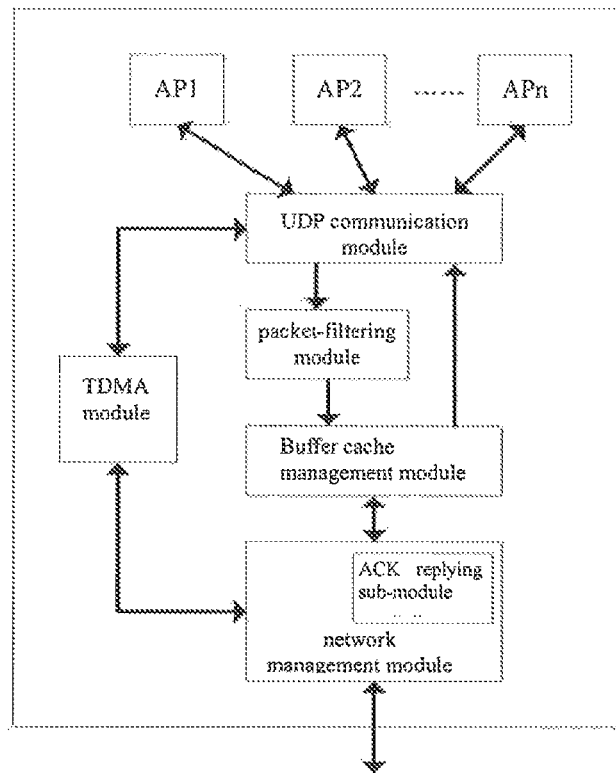
FIG. 3 is the structural diagram of the multi-AP access device.

For the realization of the method, the invention provides a multi-AP access device shown in FIG. 3. The multi-AP access device comprises five modules, including a TDMA module, a UDP (User Datagram Protocol) communication module, a packet-filtering module, a buffer cache management module and a network management module. The TDMA module is used for organizing TDMA super-frame communication; the UDP communication module adopts an UDP communication protocol and is used for transmitting the data packets from multiple APs; the packet-filtering module is used for filtering redundant repetition packets; the buffer cache management module is used for managing and accessing the buffer cache; and the network management module is the core of the whole device, is in charge of managing and maintaining the whole network and comprises an ACK replying sub-module.

The functions and the flow of each module of the multi-AP access device are as follows:

(1) TDMA module: The TDMA module contains the time source of the whole system and is used for dividing the time slot in the time domain. When an event of a time-slot beginning is triggered, the TDMA module inquires with the link table provided by the network management module and judges whether the communication business exists in the time slot. If no communication business exists, the TDMA module does not operate and enters the dormant state. If the communication business exists, the TDMA module further judges whether the time slot is the delivery time slot or the acceptance time slot; if it is the acceptance time slot, multiple APs are set at the acceptance state; if it is the delivery time slot, the TDMA module calls the UDP communication module.

(2) UDP communication module: The UDP communication module fetches the data packet in the delivery buffer cache via an interface provided by the buffer cache management module and then transmits the data packet to the corresponding AP through the UDP communication protocol; and the selection principle is the same with the principle of replying ACK. In the acceptance time slot, multiple APs in the multi-AP access device may receive the data packet from the same STA and transmits the data packet to the UDP communication module through the UDP communication protocol. At this moment, the UDP communication module may contain a plurality of duplication packets, the UDP communication module calls the packet-filtering module to filter the redundant duplication packets and puts the filtered data packet into the acceptance buffer cache through the interface provided by the buffer cache management module; and the network management module acquires the data packet through the interface provided by the buffer cache management module and carries out relative treatment.

Figure 4:
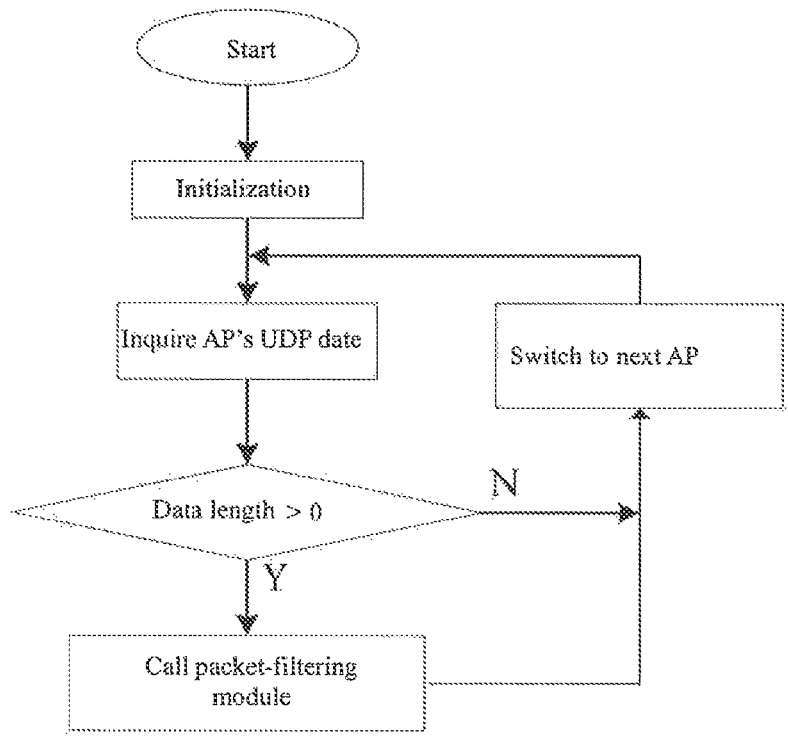
FIG. 4 is the data acceptance flow chart of the UDP communication module.

The UDP communication module has the characteristics of not needing to keep connected and the applicability of shorter control information transmission, and is capable of satisfying the requirements of high real-timeliness and bandwidth of the industrial wireless communication. The data acceptance flow of the UDP communication module is shown in FIG. 4; the initialization part comprises the initialization of the UDP module, the initialization of the buffer cache module and the initialization of the packet-filtering module. The UDP communication module inquires the UDP data of the AP and returns data length; if the data length is greater than zero, it means that AP has transmitted the data to the UDP communication module through the UDP communication protocol, and the UDP communication module calls the functions in the packet-filtering module to treat the data; or else, switch to the next AP for treatment. In this way, the LTDP communication module polls the UDP data of each AP.

Figure 5:
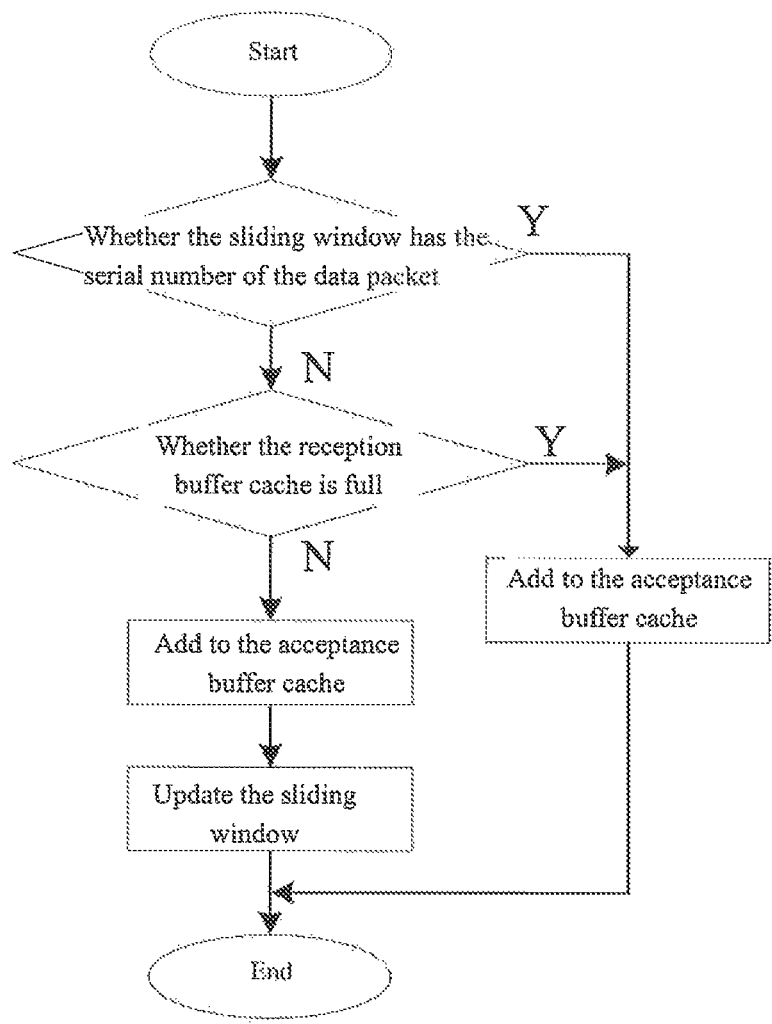
FIG. 5 is the work flow chart of the packet-filtering module.

(3) Packet-filtering module: The packet-filtering module maintains a sliding window internally and is used for recording the serial numbers of multiple recently-received UDP data packets; the serial numbers are continuously updated along with the increasing of the data packets in the acceptance buffer cache. The input of the packet-filtering module comprises the start address of the data packet, the length of the data packet and the serial number of the data packet. The program flow chart of the packet-filtering module shown in FIG. 5 is as follows: firstly, judge whether the sliding window has the serial number of the data packet; if yes, the data packet is a duplication packet and abandon the data packet; if not, further judge whether the reception buffer cache is full; if yes, abandon the data packet; or else, add the data packet to the acceptance buffer cache and then update the sliding window.

(4) Buffer cache management module: The buffer cache management module utilizes an annular queue implemented with arrays, constructs and maintains the delivery buffer cache and the acceptance buffer cache and does not need to call memory allocation functions frequently; the buffer cache management module has the characteristics of high operating speed, flexible change and high access efficiency; meanwhile, with regard to the situation that different types of the frames (including data frames, command frames, beacon frames and ACK frames) in the actual industrial communication are different in length, the length information is recorded firstly in the buffer cache of each frame, so that the access program is capable of automatically and correctly handling different types of the frames and the access consistency of the frames with different lengths is guaranteed.

(5) Network management module: The network management module is used for managing and maintaining the network according to the content of the received data packet and replying ACK.

What is claimed is:

1. A TDMA access method for broadcasting a beacon frame from a multi-AP access device to a station (STA) for use in performing time synchronization, the method comprising:
dividing n access points of a multi-AP access device that serves as a time source of a network into k groups $B_i$, with $1 \leq k \leq n$, and with a quantity j of the APs within any group $B_i$ set as $B_i = \{AP_{i1}, AP_{i2}, \ldots AP_{ij}\}$;
dividing a super-frame having a length of m into k sub-super-frames, with an $i_{th}$ sub-super-frame being made to correspond with a group $B_i$;
reserving time slots within the $i_{th}$ sub-super-frame, with the quantity of reserved time slots in the $i_{th}$ sub-super-frame being made equal to the quantity j of the APs in the corresponding group $B_i$;
determining, for a present absolute time slot number (ASN) counted from 1, if ASN % m=(m/k)*(i−1)+j; and, when it is determined that ASN % m=(m/k)*(i−1)+j is true, broadcasting a beacon frame within the corresponding time slot ASN from an $AP_{ij}$ within a group $B_i$, wherein $1 \leq i \leq k$ and k is the number of sub-super-frames.

2. The TDMA access method according to claim 1, wherein the beacon frames are broadcast frames sent by the APs and include network numbers, time slot stamps, and network resource management.

3. The TDMA access method according to claim 1, wherein the n APs of the multi-AP access device are divided into k groups such that:
the overlap section of each AP transmission range in the group is a minimum section; and
a union set of all AP transmission ranges in the group is capable of covering the whole network.

4. The TDMA access method according to claim 1, wherein the calculation method of the quantity j of the APs in a group $B_i = \{AP_{i1}, AP_{i2}, \ldots AP_{ij}\}$ is as follows:
if n % k=0, j=n/k; or else,
for $1 \leq i \leq (k-1)$, $j = \lfloor n/k \rfloor$; and for i=k, $j = \lfloor n/k \rfloor + (n \% k)$.

5. The TDMA access method according to claim 1, further comprising:
receiving at one or more APs of the multi-AP access device a data packet from the STA; and replying acknowledgement (ACK) to the STA by a network management module, wherein:
   if only one AP of the multi-AP access device receives the data packet, that AP directly replies;
   if multiple APs of the multi-AP access device receive the data packet, each AP replies according to a packet receiving success rate and a received signal strength indication RSSI.

6. The TDMA access method according to claim 5, wherein replying ACK according to the packet receiving success rate and the received signal strength indication RSSI comprises:
   searching a communication link quality mapping table,
   identifying an AP corresponding to a maximum packet receiving success rate, and
   sending ACK by the AP identified as corresponding to a maximum packet receiving success rate in the corresponding time slot.

7. The TDMA access method according to claim 6, wherein
   the communication link quality mapping table is a mapping table of communication link quality between each AP and all APs of the network in gateway maintenance, and
   the mapping table comprises the packet receiving success rate and the RSSI value, which are updated continuously along with the communication process.

8. A device configured for performing the method according to claim 1, comprising:
   a station (STA);
   a multi-AP access device having multiple access points (AP);
   a gateway; and a controller; wherein
   the STA is connected with field equipment in an industrial field and is responsible for acquiring field data and controlling a production process,
   the STA is wirelessly connected with a plurality of APs in the multi-AP access device, the plurality of APs being in a wired connection with one gateway of the multi-AP access device, and
   the multi-AP access device is configured to transmit sensor data of the field equipment acquired by the STA to the controller, and to transmit control information of the controller to the field equipment.

9. The device according to claim 8, wherein
multiple APs of the multi-AP access device are configured to share one address and work in parallel.

10. The device according to claim 8, wherein
the multi-AP access device comprises a TDMA module;
a user datagram protocol communication module;
a packet-filtering module;
a buffer cache management module; and
a network management module; wherein
the user datagram protocol communication module is configured to use a user datagram protocol (UDP) communication protocol and is used for transmitting the data packets from multiple APs,
the packet-filtering module is connected with the user datagram protocol communication module and configured for filtering redundant duplication packets,
the buffer cache management module is connected with the user datagram protocol communication module and the packet-filtering module and configured for managing and accessing the buffer cache,
the network management module is connected with the buffer cache management module and configured for delivering the data packet to the gateway, and
the TDMA module is connected with the user datagram protocol communication module and the network management module, is configured for organizing TDMA super-frame communication, and comprises an ACK replying sub-module.

11. The TDMA access method according to claim 6, wherein replying ACK according to the packet receiving success rate and the received signal strength indication RSSI further comprises:
   if multiple APs are identified as having equal maximum packet receiving success rates, identifying from those APs having equal maximum packet receiving success rates an AP with a maximum RSSI value, and
   sending ACK by the AP identified as corresponding to a maximum packet receiving success rate and a maximum RSSI value in the corresponding time slot.

12. The TDMA access method according to claim 11, wherein replying ACK according to the packet receiving success rate and the received signal strength indication RSSI further comprises:
   if multiple APs are identified as having equal maximum packet receiving success rates and equal maximum RSSI values,
   sending ACK by an AP randomly chosen from those APs having equal maximum packet receiving success rates and equal maximum RSSI values in the corresponding time slot.

* * * * *